United States Patent [19]

Takei et al.

[11] Patent Number: 4,694,125
[45] Date of Patent: Sep. 15, 1987

[54] COLLECTOR DEVICE FOR TROLLEY-ASSISTED VEHICLES

[75] Inventors: Hidetoshi Takei, Ayase; Teruo Minami, Kawasaki, both of Japan

[73] Assignee: Toyo Denki Seizo Kabushiki Kaisha and Komatsu Ltd., Tokyo, Japan

[21] Appl. No.: 887,564

[22] Filed: Jul. 17, 1986

[30] Foreign Application Priority Data

Jul. 22, 1985 [JP]  Japan .................. 60-160322
Jul. 22, 1985 [JP]  Japan .................. 60-160323

[51] Int. Cl.⁴ .......................... B60L 5/00; B60L 5/04
[52] U.S. Cl. ........................................ 191/87; 191/85
[58] Field of Search ............. 191/17, 59.1, 45 R, 191/38, 85, 87, 86, 49, 90; 105/341; 246/182 A, 182 C, 182 R, ; 200/61.58 R, 61.71, 51.09, 51.1, 51.11; 307/9, 119, 39; 361/179

[56] References Cited

FOREIGN PATENT DOCUMENTS

509721  1/1975  Japan .
514906  1/1976  Japan .
551207  5/1977  U.S.S.R. .................. 191/87
672075  7/1979  U.S.S.R. .................. 191/85

Primary Examiner—Randolph A. Reese
Assistant Examiner—Charles Barrett
Attorney, Agent, or Firm—Silverman, Cass, Singer & Winburn, Ltd.

[57] ABSTRACT

A collector device for trolley-assisted vehicles having a pantograph operating circuit acting to deenergize the pantograph operating electromagnetic valve, when a driver inadvertently intends to leave the vehicle while pantographs are in the working position by automatically bringing the pantographs down to leave overhead contact wire thus to avoid electric shock accident.

6 Claims, 7 Drawing Figures

COLLECTOR DEVICE FOR TROLLEY-ASSISTED VEHICLES

BACKGROUND OF THE INVENTION

1. Field of the Invention

The present invention relates to collector device of a trolley-assisted vehicles, such as dump trucks used for the transportation of ores in large mines, etc. In an area in which low cost electric supply is available and thus the fuel cost is comparatively high, trolley-assisted dump trucks are used for decreasing the transportation cost. Furthermore, in mines, in which contamination of the working pit by the exhaust gas of the dump trucks causes a big problem, the same trolley-assisted dump trucks are used for decreasing the amount of exhaust gas. More especially, cheap main electric supply collected by overhead contact system is utilized for the full load up-hill course starting from the working pit located at bottom to outside of the mine and to the contrary the vehicle engine is used for the no load down-hill returning course. The invention relates particularly to a power collector device of such trolley-assisted dump trucks.

2. Prior Art

Figure 1A:
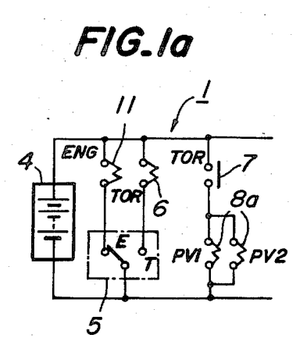
FIG. 1a and FIG. 1b are simplified diagrams of pantograph operating circuit and pantograph driving mechanism of conventional trolley-assisted vehicles, which have been explained in the foregoing.
Figure 1B:
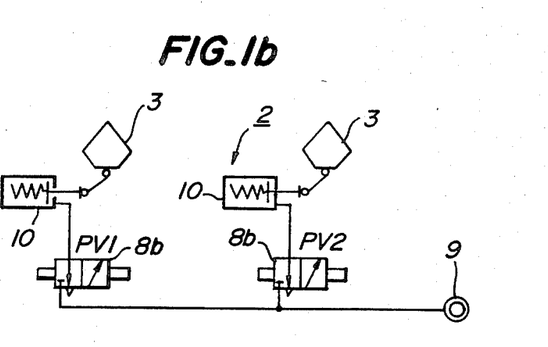

A conventional power collector device of such a trolley-assisted vehicle is as shown in FIG. 1a and FIG. 1b and it comprises a pantograph controlling circuit 1. By this pantograph controlling circuit 1, a pantograph operating mechanism 2 is operated. When the pantograph is in the working condition contacting with the contact wire, the vehicle is driven through the contact wire supplied power by a current collector and driving circuit not shown in the drawing.

The pantograph controlling circuit 1 is fed from a vehicle mounted battery 4. This vehicle mounted battery 4 is also used as a power source in a controlling circuit (not shown) for electrically driving the trolley-assisted vehicles, for controlling an ac generator driven by the Diesel engine in the engine mode, and for the supply of low voltage power source to the various equipments.

When a mode changing switch 5 provided on the dashboard of the drivers cabin is thrown to trolley mode side T, a controlling relay or a trolley mode relay (TOR) 6 in the pantograph controlling circuit 1 is energized and by the closure of its relay contact 7, a pantograph controlling electromagnetic valve 8 (PV1 and PV2) is energized. More precisely, a pantograph controlling solenoid 8a is energized and a pantograph controlling valve 8b is actuated thereby. By this, pressurized operative fluid (for instance air) is introduced into a cylinder 10 from an operative fluid source 9, and the pantograph 3 is raised by a link mechanism to contact the overhead contact system. By this operation, trolley mode running is prepared by a driving circuit operated by the collected supply current not shown in the drawing.

When the trolley mode changing switch 5 is thrown into the engine mode E side, the TOR relay 6 is deenergized and by the open relay contact 7, the pantograph controlling electromagnetic valve 8 (solenoid 8a and controlling valve 8b) is deenergized and thus the pressurized fluid in the cylinder is drained and thus the pantograph 3 is brought to down position and is separated from the overhead contact system. At the same time, in the illustrated embodiment shown in FIGS. 1a and 1b, an engine mode instruction is initiated by an engine mode relay (ENG) 11 and engine mode self-running by the Diesel engine (not shown) is prepared.

In this known circuit, however, if the driver or the assistant had forgotton to through the mode changing switch 5 to E side (non-trolley mode) at stopping condition and placing the switch to T side (trolley mode) and thus leaving the pantograph at raised condition to contact the overhead contact system, there is a danger that the driver or the assistant may get an electric shock when leaving the vehicle since the vehicle body potential is insulated from the ground by the tire of the dump trucks and thus there is no assurance that the body potential is kept at ground level.

In a usual trolley bus or a new traffic system using a third rail and alway running in the trolley mode, the vehicle body is connected to the ground potential by an earth shoe such as disclosed in the Japanese Utility Model Publication No. 9721/50 or No. 4906/51 when stopping at home station in order to assure security for passengers.

Whereas in the abovementioned trolley-assisted vehicles, which operate by changing the driving mode, more especially in the trolley-assisted dump trucks, as there is no need to consider such a frequent getting on or off of passengers at certain predetermined stations like the third rail new traffic system or the trolley bus, only a general consideration is given for the getting on or off of the driver or assistant at non-limited locations. Namely the only problem to be taken into account is the occasion of getting on or off of the driver or assistant from the trolley-assisted vehicles at non-limited locations.

SUMMARY OF THE INVENTION

The object of the present invention is to provide a simple electric collector device for the trolley-assisted vehicles being able to prevent unintentional accident by an electric shock or high potential shocking when the driver or the assistant may get off of the vehicle, while leaving the pantograph in contact with the overhead contact system.

Further object of the invention is to obtain such kind of equipment to act automatically to decrease the collecting current and to pull down the pantograph in order to prevent the accident by electric shock and also to avoid occurrence of abnormal damages of the electric collector equipment by sudden leaving from the overhead contact system.

Means for Solving the Problem

In order to achieve the aforementioned object of the present invention, the collector device for trolley-assisted vehicles comprising a pantograph operating circuit having a mode changing switch for switching trolley mode and non-trolley mode, a pantograph operating electromagnetic valve being energized in the trolley mode of the mode changing switch and deenergized in the non-trolley mode, and a battery for supplying the pantograph operating electromagnetic valve. The vehicle can be driven by power fed from an overhead contact system collected by a pantograph being operated into working position to contact with the overhead contact system by energization of the pantograph operating electromagnetic valve and to leave the overhead contact system at deenergization of the valve by a pantograph controlling mechanism which is characterized in that the pantograph operating circuit comprises;

a first switching circuit portion being set when a door switch corelated to doors of the vehicle is in closed condition and the mode changing switch is in non-trolley mode, and being reset when the mode changing switch is in trolley mode and the door switch is in open condition, and a second switching circuit portion which energizes the pantograph operating electromagnetic valve when the first switching circuit portion is set condition and the trolley mode changing switch is in trolley mode, and deenergizes said pantograph operating electromagnetic valve when the first switching portion is reset condition and the trolley mode changing switch is in non-trolley mode.

Function

In accordance with the aforementioned construction, for placing the pantographs at working position by energizing the pantograph operating electromagnetic valve, it is required to bring the first switching circuit portion in set condition at first by closing the doors of the driver's cabin and by throwing the mode changing switch into non-trolley mode side. Then by throwing the mode changing switch into trolley mode side, the pantograph operating electromagnetic valve is energized by the second switching circuit portion and the pantographs are brought up by driving mechanisms into the working position and come in contact with the overhead contact system.

In a condition that the mode changing switch is in trolley mode thus the pantograph is in contact with the overhead contact system, if the driver or the assistant would leave the vehicle while forgetting to throw the mode changing switch into non-trolley mode, the first switching circuit portion is reset and the pantograph operating electromagnetic valve is deenergized by the second switching circuit portion so that the pantographs are automatically lowered and leave the trolley. If the door is closed after this condition, the first switching circuit portion is not set and for setting this circuit portion, the mode changing switch should once be thrown into non-trolley mode.

Modified Embodiment

In a further aspect of the invention, the collector device for trolley-assisted vehicles comprising a pantograph operating circuit having a mode changing switch for switching trolley mode and non-trolley mode, a pantograph operating electromagnetic valve being energized in the trolley mode of the mode changing switch and deenergized in the non-trolley mode, and a battery for supplying the pantograph operating electromagnetic valve. The vehicle can be driven by power via a collecting and rectifying circuit and fed from overhead wire collected by pantographs being operated into working position to contact with the overhead contact system by energization of the pantograph operating electromagnetic valve and to leave the overhead contact system at deenergization of the valve by a pantograph controlling mechanism which is characterized in that the pantograph operating circuit comprises;

a first switching circuit portion being set when a door switch corelated to doors of the vehicle is in closed condition and the mode changing switch is in non-trolley mode, and being reset when the mode changing switch is in trolley mode and the door switch is in open condition, and a second switching circuit portion which energizes the pantograph operating electromagnetic valve when the first switching circuit portion is set condition and the trolley mode changing switch is in trolley mode, and deenergizes said pantograph operating electromagnetic valve when the first switching portion is reset and the trolley mode changing switch is in non-trolley mode, wherein the collecting and rectifying circuit comprises a third switching circuit portion acting as a rectification controlling circuit of the collecting and rectifying circuit limiting the collecting current during a switching time of the first switching circuit portion from its set condition to reset condition.

In this embodiment, there is provided a time delay before actual descending motion of the pantograph and during this time delay, the collector current is limited at a small value by the third switching circuit portion using the rectification controlling circuit so that any possible damage by a heavy current at sudden leaving of the pantographs from the overhead contact system can be avoided.

DESCRIPTION OF THE PREFERRED EMBODIMENT

First Embodiment

The invention will now be explained in more detail by referring to preferred embodiments.

Figure 2:
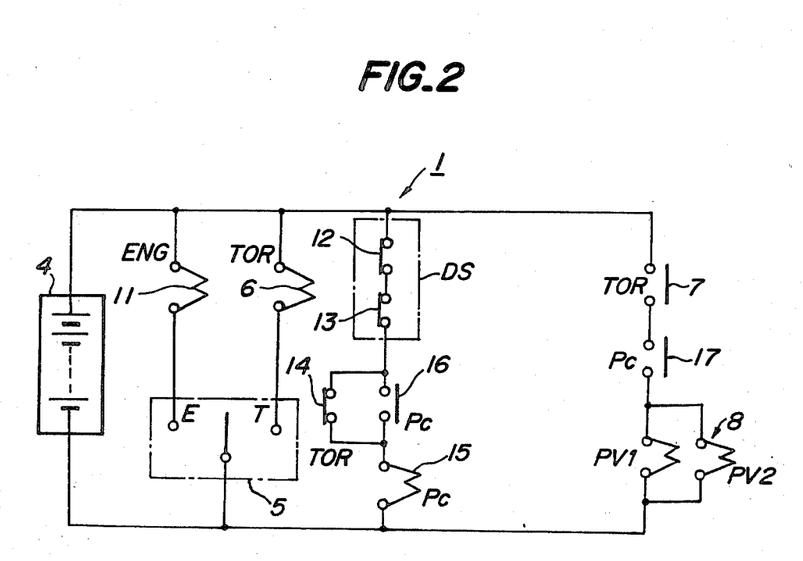
FIG. 2 is a circuit diagram for showing essential portion of a first embodiment of the present invention for the collector device of the trolley-assisted vehicles.

FIG. 2 shows a first embodiment of the invention for a pantograph controlling circuit of the current collector device. This embodiment differs from the conventional circuit shown in FIGS. 1a and 1b in that a second controlling relay system, namely a pantograph controlling (PC) relay system is added in addition to the conventional trolley mode controlling (TOR) relay system. This pantograph controlling (PC) relay system comprises a first switching circuit portion including a series connection of door contacts 12 and 13 of door switch (DS), a normally close contact 14, which opens the contact by the actuation of TOR relay in the trolley mode and closes the contact by the deenergization of the same in the non-trolley mode, and a pantograph controlling (PC) relay 15, wherein a self-holding contact 16 operated by the PC relay is connected in parallel with the normally close contact 14. This first circuit portion is further connected in parallel with a second switching circuit portion including a relay contact 7 operated by the TOR relay 6 and a pantograph controlling electromagnetic valve 8. Said relay contact 7 is further connected in series with a relay contact 17 operated by teh PC relay 15 and thus this second circuit portion is completed as shown in the drawing.

According to this construction of the circuit, in the condition that the driver's doors are closed and the trolley mode changing switch 5 is thrown into the non-trolley mode (E) side, the PC relay 15 is energized through the door contacts 12 and 13 of the door switch (DS) and the normally close contact 14 and thus its self-holding contact 16 is closed. At the same time, the relay contact 17 in the second switching circuit portion is closed. Under this condition, even if the mode changing switch 5 is thrown into trolley mode side T, the PC relay 15 is still kept in the energized condition despite the opening of the normally close contact 14, since the self-holding contact 16 is closed. Therefore, the first switching circuit portion remains in the set condition and by the closure of the relay contact 7 in the second switching circuit portion, the pantograph operating electromagnetic valve 8 (windings PV1 and PV2) is energized. The pantographs are now brought up and come in contact with the overhead contact system.

If the driver would leave the driver's cabin and inadvertently opens the door while forgetting to throw the trolley mode changing switch to the non-trolley mode (E) side and thus while putting the switch at trolley mode (T) side and as the consequence the pantographs are in contact with the overhead contact system, either one of the door contacts 12 and 13 opens and the current to the PC relay 15 is interrupted. By this interruption, the self-holding contact 16 is opened and the first switching circuit portion is reset. Thereby the relay contact 17 in the second switching portion is opened and the pantograph operating electromagnetic valve 8 (PV1, PV2) is deenergized and thus the pantographs descend automatically and leave from the overhead contact system. By subsequent closure of the doors, PC relay is kept in the deenergized condition and thus the first switching circuit portion is kept in the reset condition since the normally close contact 14 and the self-holding contact 16 are opened as far as the mode changing switch 5 is in the T side.

In order to bring the first switching circuit portion into set condition again, the mode changing switch 5 is once switched to non-trolley mode (E) side and to put the normally close contact 14 again in the closed condition. By the present invention, the electric accident or the high tension shocking due to carelessness of the driver is definitely avoided.

Second Embodiment

Figure 3:
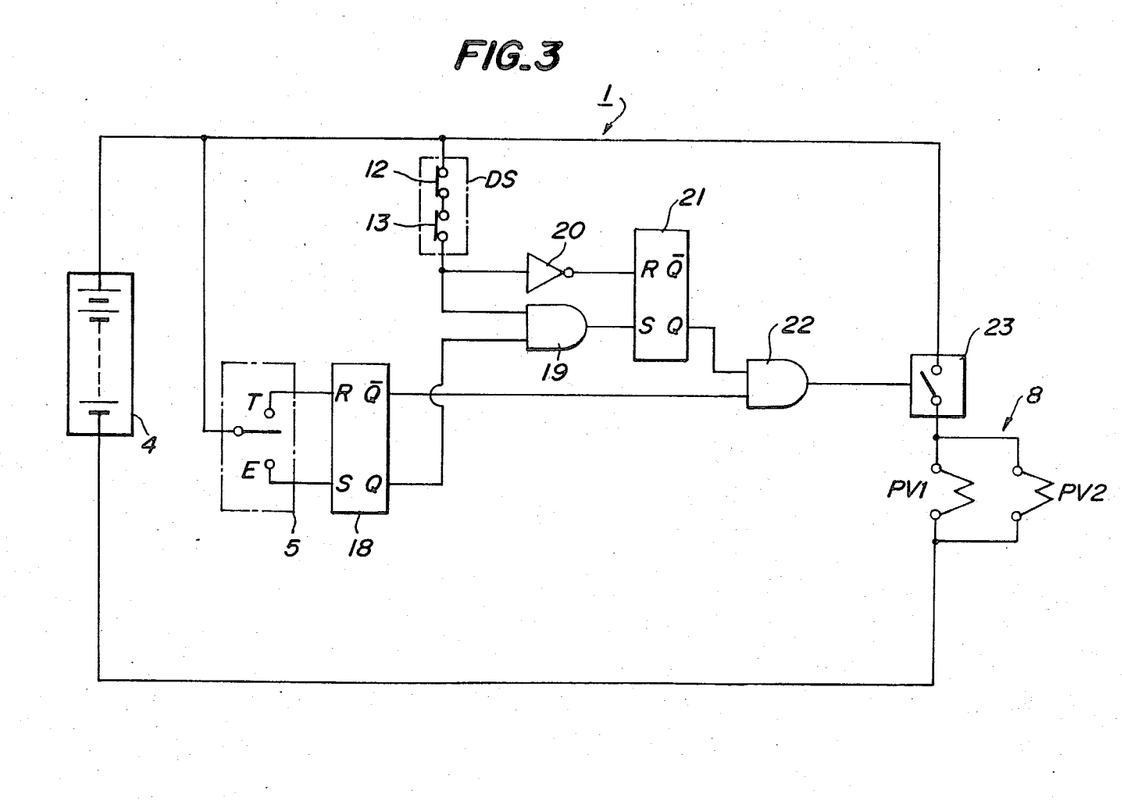
FIG. 3 is an operational circuit diagram of a second embodiment of the present invention for the collector device of the trolley-assisted vehicles.

The second preferred embodiment of the pantograph controlling circuit in the electric collector device according to the present invention is shown in FIG. 3. This embodiment is to eliminate the use of relay contact as in the case of the first embodiment but to use contactless elements.

In this embodiment, the first switching circuit portion comprises a first flip-flop 18 having a set input S connected to non-trolley mode contact E of the mode changing switch 5 and a reset input R connected to trolley mode contact T of the mode changing switch 5, a first AND gate 19 being supplied to its inputs an output of the door switch DS connected to the battery 4 and Q output of the first flip-flop 18, a NOT circuit 20 having its input connected to the door switch DS in parallel with the first AND gate 19, and a second flip-flop 21 having a set input S connected to the output of the first AND gate 19 and a reset input R connected to the output of the NOT circuit 20.

The second switching circuit portion comprises a second AND gate 22 having an input connected to Q output of the second flip-flop 21 and another input connected to $\overline{Q}$ output of the first flip-flop 18, and a switching element 23 having an input connected to the output of the second AND gate 22 and acting to turn-on and turn-off the current supply circuit leading from the battery 4 to the pantograph operating electromagnetic valve 8 (PV1, PV2).

The flip-flops 18 and 20 have the operative feature as indicated in the following Table 1.

TABLE 1

| (Operating feature) | | |
|---|---|---|
| Input | | Condition |
| R | S | Q |
| 0 | 0 | Q |
| 1 | 0 | 0 |
| 0 | 1 | 1 |
| 1 | 1 | — |

According to the above construction, when the mode changing switch 5 is in the non-trolley mode side (E) and the door is closed, the first flip-flop 18 delivers logic value "1" from its Q output to the first AND gate 19. At this time, the set input S of the second flip-flop 21 becomes logic value "1" and the reset input R become logic value "0" through the NOT circuit 20 so that Q output of the second flip-flop delivers logic value "1" as can be seen from the Table 1. Namely the first switching circuit portion becomes set condition.

Then if the mode changing switch 5 is thrown into trolley mode side (T), the first flip-flop 18 is reset by an input of the reset input R and delivers "0" from the Q output and "1" from the $\overline{Q}$ output. At this time the set input S of the second flip-flop 21 becomes "0" but as there is no variation on the reset input R i.e. as it remains "0", the flip-flop 21 remains set condition on the Q output condition "1". On the other hand as the logic value "1" is delivered from the $\overline{Q}$ output of the first flip-flop 18, both the inputs of the second AND gate 22 in the second switching circuit portion are supplied with logic value "1", respectively. Accordingly, the output of the second AND gate 22 also becomes "1" and the switching element 23 also becomes on condition and the pantograph operating electromagnetic valve 8 (PV1, PV2) is energized and pantograph are now moved up and brought in contact with the overhead contact system.

If the driver of the trolley-assisted dump truck inadvertently would leave the vehicle and opens the door, while forgetting to throw the mode changing switch 5 to the non-trolley mode (E) side and thereby the mode changing switch 5 is located at trolley mode (T) side and the pantograph are in contact with the overhead contact system, either one of the door contacts 12 and 13 opens and via the NOT circuit 20, logic value "1" is fed to the reset input of the second flip-flop 21 and this second flip-flop is reset thereby. (In this case, the second flip-flop 21 delivers "0" at its Q output.) Namely, the first switching circuit portion becomes reset condition. According to this action, the output of the second AND gate 22 in the second switching circuit portion becomes "0" and thus the pantograph operating electromagnetic valve 8 (PV1, PV2) is deenergized and the pantographs are separated from the overhead contact system as mentioned above by automatic descending motion. Thereafter, even the door is closed again, the pantograph operating electromagnetic valve 8 will not be energized as far as the mode changing switch 5 is thrown into T side since the second flip-flop 21 of the first switching circuit portion remains in reset condition. In order to bring the first switching circuit portion again in the set condition, the mode changing switch 5 must be thrown into non-trolley mode (E) side and to set the second flip-flop 21 by applying logic value "1" at the set input S thereof. By the manner described above electric accident like electric shocking etc. may be avoided.

Third Embodiment

Figure 4:
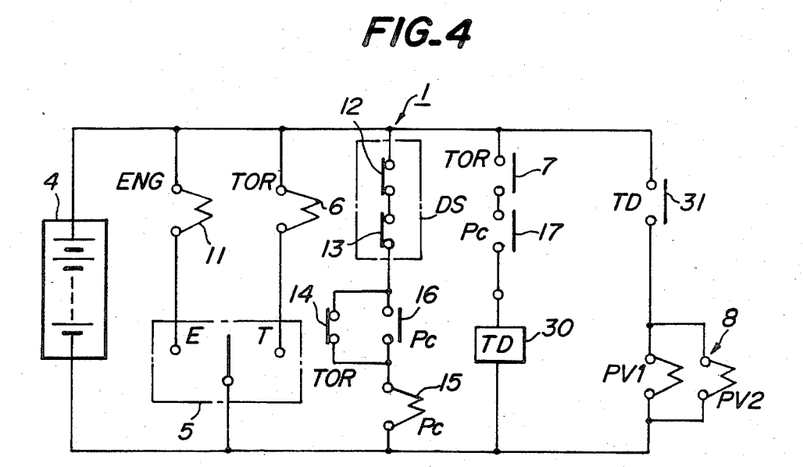
FIG. 4 is a circuit diagram for showing essential portion of a third embodiment of the present invention having the time delay function for the collector device of the trolley-assisted vehicles.

FIG. 4 shows a third embodiment of the present invention.

This embodiment differs from the first embodiment only in the second switching circuit portion so that the explanation will be given only for the different point.

The second switching circuit portion comprises a parallel connection of two circuit branches. One of which, a third circuit portion consists of a series connection of a relay contact 7 operated by the TOR relay 6, a relay contact 17 operated by the PC relay 15 and an off-delay relay (TD) 30. The other circuit branch, a fourth circuit portion consists of a series connection of a contact 31 operated by the off-delay relay 30 and the pantograph operating electromagnetic valve 8.

In the set condition of the first switching circuit portion, by throwing the trolley mode changing switch 5 to the trolley mode T, the PC relay 15 is kept energized through its self-holding contact 16 and the first switching circuit portion is kept in the set condition. In the second switching circuit portion, by closure of the relay contact 7, the off-delay relay 30 is energized and the pantograph operating electromagnetic valve 8 (PV1, PV2) is energized. By this the pantographs are driven upwardly and come in contact with the overhead contact system.

If the driver would leave the driver's cabin and inadvertently opens the door while forgetting to throw the trolley mode changing switch to the non-trolley mode (E) side and thus while putting the switch in the trolley mode (T) side and as the consequence the pantographs are in raised condition to contact with the overhead contact system, either one of the door contacts 12 or 13 opens and the current to the PC relay 15 is interrupted. The self-holding contact 16 is now opened and the first switching circuit portion is reset as same as the first embodiment. Thereby the relay contact 17 in the second switching portion is opened and the relay contact 31 is opened after a small delay time produced by the off-delay relay 30 and thus the pantographs come down automatically by the deenergization of the pantograph operating electromagnetic valve 8 (PV1, PV2). Thus the electric accident or shocking due to careless action of the driver can be avoided just in the same manner with the first embodiment.

At resetting of the first switching circuit portion, during the abovementioned delay time the first circuit branch of the second switching circuit portion acts to control the rectification controlling circuit of the collector and rectification circuit to decrease the collecting current. If the collecting current is not limited, the pantographs may be damaged by melting at interruption of the collecting current by sudden descending of the pantograph, and occurrence of abnormal spark in the rectifying circuit by a sudden variation of the motor current.

Figure 5:
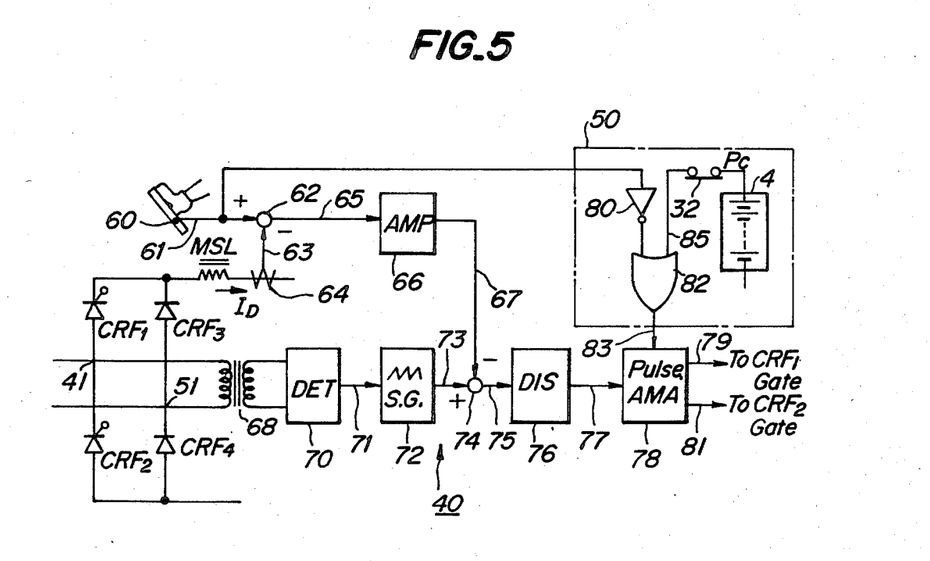
FIG. 5 is a circuit diagram for showing one embodiment of a rectification controlling circuit of the collecting and rectifying circuit used in the trolley-assisted vehicles of the present invention.

An embodiment of the rectification controlling circuit is shown in FIG. 5.

In the embodiment shown in FIG. 5, a combined bridge type rectifiers CRF1–CRF4 are used as the collector and rectifier circuit. In the supply current collector control circuit 40 shown in FIG. 5, reference numeral 60 designates a transducer generating an electric signal in proportion to the depression angle of the accelerator pedal and 64 is a current detector which detects d.c. current $I_D$ adjusted by the turn-on angle of the thyristors CRF1, and CRF2. An operational circuit 62 compares the accelerator pedal signal 61 and the current detector signal 63 and delivers an output deviation signal 65 corresponding to a difference therebetween. This deviation signal 65 is applied to an amplifier 66 which amplifies this signal and delivers an output signal 67 to be used as a phase instruction and fed to an input of an operational circuit 74. A zero-detection circuit 70 detecting zero point of the a.c. voltage stepped down by a transformer 68 which delivers double frequency pulse signal 71 synchronized with the zero point of the a.c. voltage. A saw-tooth wave generator 72 delivers a saw-tooth wave signal 73 synchronized with the above pulse signal 71 and this output is fed to another input of the operation circuit 74. A discriminating circuit 76 being supplied with the output signal 75 from the operation circuit 74 delivers pulse signal 77 having logical value "0" or "1" depending on positive or negative of said output 75 from 74.

This pulse signal 77 has the value in proportion to the input a.c. frequency and its pulse width is in proportion to a deviation between the accelerator instruction signal 61 and the actual circuit current 63. This pulse signal 77 used as the turn-on signals 79 and 81 for thyristors CRF1 and CRF2 after amplified in a pulse amplifier 78. This rectification controlling circuit 40 is provided with a third switching circuit portion 50. This third switching circuit portion 50 comprises a NOT circuit 80 connected to the transducer 60 and an OR gate 82 having one input connected to the NOT circuit 80 and another input fed with a supply voltage 4 via a relay contact 32 controlled by the PC relay 15. By the output signal 83 from the OR gate 82, the turn-on signals 79 and 81 are prohibited from generation as far as the accelerator pedal is in off condition and/or the PC relay 15 is in set condition. By the above construction, the rectification controlling circuit forms a closed loop circuit and driving force in proportion to the depression angle is obtained automatically and at the same time in the reset condition of the first switching circuit portion, the collector current becomes zero even the acclerator pedal is depressed.

Fourth Embodiment

Figure 6:
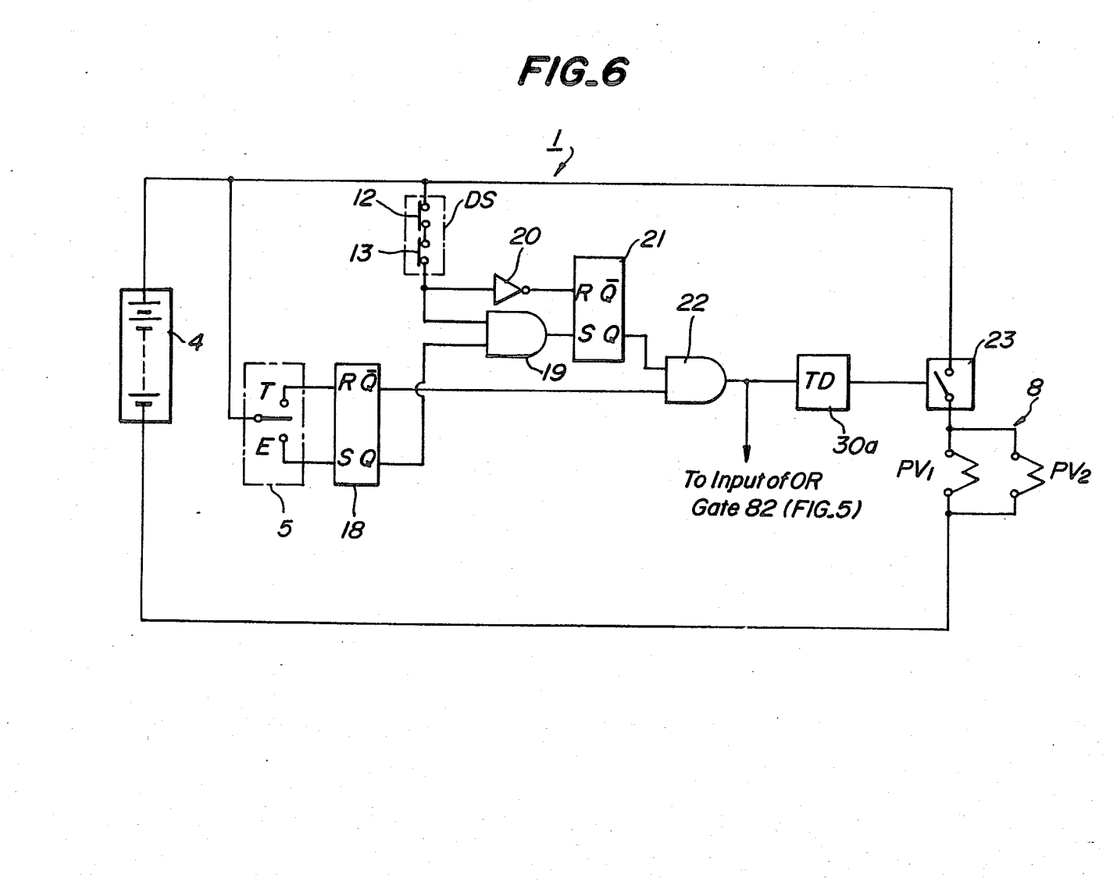
FIG. 6 is an operational circuit diagram of a fourth embodiment of the present invention also having the time delay function for the collector device of the trolley-assisted vehicles.

The fourth embodiment of the present invention for the pantograph operating circuit of the current collecting device is shown in FIG. 6. This embodiment is very similar to the second embodiment shown in FIG. 3 and using contactless elements.

The first switching circuit portion is identical with the second embodiment and the same reference numerals are used to show each of the corresponding elements so that only the other portion will be explained.

The second switching circuit portion comprises second AND gate 22, which is same as the previous embodiment. This portion further comprises an off-delay circuit (TD) 30a having an input connected to an output of the second AND gate 22 and a switching element 23 having an input connected to the off-delay circuit 30a and acting to open and close the current path from the battery 4 to the pantograph operating electromagnetic valve 8 (PV1, PV2). The output of the second AND gate 22 is connected to one input of the OR gate 82 shown in FIG. 5.

The characteristics of the flip-flops 18 and 20 are the same as shown in Table 1.

The first switching portion operates as same as the second embodiment. Namely, when the driver would leave the vehicle and opens the door while forgetting to throw the mode changing switch to non-trolley mode (E) side, the first switching circuit portion is changed to reset condition. In this case, the output of the second AND gate 22 in the second switching circuit portion becomes "0" and after a short delay provided by the off-delay circuit (TD) 30a, the pantograph operating electromagnetic valve 8 (PV1, PV2) is deenergized and the pantograph is automatically brought down and leaves the overhead contact system. During the above-mentioned delay time, the collector current is limited to a small value by the third switching circuit portion 50 (refer to FIG. 5). From this condition, the pantograph operating electromagnetic valve will not be energized by the closure of the door as far as the mode changing switch is thrown in the T side since the second flip-flop 21 in the first switching circuit portion is in reset condition. Thus the electric accident like electric shocking may be prevented definitely and the collector device may not be damaged by the sudden leaving of the pantograph.

Effect of the Invention

As has been explained in the foregoing, according to the present invention, the electric accident or electric shocking may definitely be prevented even there is mishandling of the driver by using simple circuit construction and not using the earth shoe used in the conventional traffic system of running always in trolley mode.

Also a damage due to heavy current in the collector device can be prevented in the preferred embodiment.

In the case of the second and fourth embodiments, as the contactless circuit is used, the system has maintenance free feature and a long life is guaranteed.

What is claimed is:

1. Collector device for trolley-assisted vehicles comprising a pantograph operating circuit having a mode changing switch for switching trolley mode and non-trolley mode, a pantograph operating electromagnetic valve being energized in the trolley mode of the mode changing switch and deenergized in the non-trolley mode, and a battery for supplying the pantograph operating electromagnetic valve, the vehicle can be driven by a power fed from overhead contact system collected by pantographs being operated into working position to contact with the overhead contact system by energization of the pantograph operating electromagnetic valve and to leave the overhead contact system at deenergization of the valve by a pantograph controlling mechanism, characterized in that the pantograph operating circuit comprises;

a first switching circuit portion being set when a door switch corelated to doors of the vehicle is in closed condition and the mode changing switch is in non-trolley mode, and being reset when the mode changing switch is in trolley mode and the door switch is in open condition, and a second switching circuit portion which energizes the pantograph operating electromagnetic valve when the first switching circuit portion is set condition and the trolley mode changing switch is in trolley mode, and deenergizes said pantograph operating electromagnetic valve when the first switching portion is reset condition and the trolley mode changing switch is in non-trolley mode.

2. Collector device for trolley-assisted vehicles as claimed in claim 1, wherein said first switching circuit portion comprises;

a first circuit portion including series connection of the mode changing switch and a first control relay, a second circuit portion including a series connection of the door switch, a normally close contact being controlled by the first control relay to open when the mode changing switch is in trolley mode and to close when the mode changing switch is in non-trolley mode, and a second control relay successively, and further a self-holding contact of said second control relay is connected in parallel with said normally close contact, and the second switching circuit portion comprises a third circuit portion including a series connection of a relay contact operated by the first control relay, a relay contact operated by the second control relay, and said pantograph operating electromagnetic valve in succession, and the first, the second and the third circuit portions are connected in parallel with a supply battery.

3. Collector device for trolley-assisted vehicles as claimed in claim 1, wherein said first switching circuit portion comprises;

a first flip-flop having a set input connected to a non-trolley mode contact of the mode changing switch and a reset input connected to a trolley mode contact of the mode changing switch, a first AND gate having an input connected to the battery through the door contact and another input connected to Q output of the first flip-flop, a NOT circuit having an input connected to the door contact, and a second flip-flop having a set input connected to an output of the first AND gate and a reset input connected to an output of the NOT circuit, and said second switching circuit portion comprises a second AND gate having an input connected to Q output of the second flip-flop and another input connected to $\overline{Q}$ output of the first flip-flop, and a switching element having an input connected to an output of the second AND gate and which acts to turn-on and turn-off a supply path from the battery to the pantograph operating electromagnetic valve.

4. Collector device for trolley-assisted vehicles comprising a pantograph operating circuit having a mode changing switch for switching trolley mode and non-trolley trolley mode, a pantograph operating electromagnetic valve being energized in the trolley mode of the mode changing switch and deenergized in the non-trolley mode, and a battery for supplying the pantograph operating electromagnetic valve, the vehicle can be driven by power via a collecting and rectifying circuit and fed from overhead contact system collected by pantographs being operated into working position to contact with the overhead contact system by energization of the pantograph operating electromagnetic valve and to leave the overhead contact system at deenergization of the valve by a pantograph controlling mechanism, characterized in that the pantograph operating circuit comprises;

a first switching circuit portion being set when a door switch corelated to doors of the vehicle is in closed condition and the mode changing switch is in non-trolley mode, and being reset when the mode changing switch is in trolley mode and the door switch is in open condition, and a second switching circuit portion which energizes the pantograph operating electromagnetic valve when the first switching circuit portion is set condition and the trolley mode changing switch is in trolley mode, and deenergizes said pantograph operating electromagnetic valve when the first switching portion is reset condition and the trolley mode changing switch is in non-trolley mode, wherein the collecting and rectifying circuit comprises a third switching circuit portion acting to a rectification controlling circuit of the collecting and rectifying circuit to limit the collecting current during a switching time of the first switching circuit portion from its set condition to reset condition.

5. Collector device for trolley-assisted vehicles as claimed in claim 4, wherein said first switching circuit portion comprises;

a first circuit portion including series connection of the mode changing switch and a first control relay, a second circuit portion including a series connection of the door switch, a normally close contact being controlled by the first control relay to open when the mode changing switch is in trolley mode and to close when the mode changing switch is in non-trolley mode, and a second control relay successively, and further a self-holding contact of said second control relay is connected in parallel with said normally close contact, wherein the second switching circuit portion comprises a third circuit portion including a series connection of a relay contact operated by the first control relay, a relay contact operated by the second control relay, and an off-delay relay connected in succession, and a fourth circuit portion connected in parallel with said third circuit portion and the fourth circuit portion is formed of a series connection of a relay contact controlled by said off-delay relay and said pantograph operating electromagnetic valve in succession, and the first, the second and the third circuit portions are connected in parallel with a supply battery.

6. Collector device for trolley-assisted vehicles as claimed in claim 4, wherein said first switching circuit portion comprises;

a first flip-flop having a set input connected to a non-trolley mode contact of the mode changing switch and a reset input connected to a trolley mode contact of the mode changing switch, a first AND gate having an input connected to the battery through the door contract and another input connected to Q output of the first flip-flop, a NOT circuit having an input connected to the door contact, and a second flip-flop having a set input connected to an output of the first AND gate and a reset input connected to an output of the NOT circuit, and said second switching circuit portion comprises a second AND gate having an input connected to Q output of the second flip-flop and another input connected to $\overline{Q}$ output of the first flip-flop, an off-delay circuit having an input connected to an output of said second AND gate, and a switching element having an input connected to an output of the off-delay circuit and which acts to turn-on and turn-off a supply path from the battery to the pantograph operating electromagnetic valve.

* * * * *